July 11, 1933.  A. G. DECKER  1,917,926
SPRING GIB
Filed July 24, 1929  2 Sheets-Sheet 1

July 11, 1933.  A. G. DECKER  1,917,926
SPRING GIB
Filed July 24, 1929  2 Sheets-Sheet 2

Inventor
Alonzo G. Decker
By
Edwin Hauser
Attorney

Witness
Porter H. Plautz

Patented July 11, 1933

1,917,926

UNITED STATES PATENT OFFICE

ALONZO G. DECKER, OF BALTIMORE, MARYLAND, ASSIGNOR TO THE BLACK & DECKER MANUFACTURING COMPANY, OF TOWSON, MARYLAND, A CORPORATION OF MARYLAND

SPRING GIB

Application filed July 24, 1929. Serial No. 380,499.

In various machine tools and in grinding machines for numerous purposes, including bench machines for resurfacing the poppet valves of internal combustion motors, there is a carriage for the workholder, tool or rotating stone, which carriage is mounted to slide on a table, bedplate or support which is provided with a suitable slideway or way, the carriage, in turn, having a slide which engages the way or slideway. In accordance with the regular practice the slide is formed with a downwardly disposed groove most frequently of dovetailed cross section and the way has a dovetailed elongated rib which fits in the groove. This arrangement may, of course, be reversed. The carriage is moved or fed along the way by means of a screw or any preferred feeding means.

On account of the difficulties and expense incident to machining parts with sufficient accuracy to give the desired fit the practice in this regard has long included the provision of a member known as a gib located in the groove and between the slide and the way. This gib is ordinarily carried by the slide and is adjusted toward and from the way to take up the wear and play between the parts.

To avoid the necessity for frequent adjustments which must be performed with great care and accuracy, various gibs have been provided which are automatically adjusted by means of springs. There are several of these springs on each slide and they are spaced along the gib which is of considerable extent. In fact, they have ordinarily taken the places of the adjusting screws which were spaced along the slide at substantially equal intervals. According to the commonest practice, each spring works through a plunger which bears directly on the gib and to equalize the springs, each spring is provided with an adjusting screw by which its tension may be varied so that each spring assembly, including the plunger, spring and adjusting screws, has become quite complicated and the gib assembly comprises quite a number of parts.

The present invention has as its object the provision of a spring gib which is an integral structure and in which the spring may extend the entire length of the gib so that varying pressures can be applied at a series of points distributed along the gib throughout its length or a considerable portion of it, the adjustment being permanent when the spring is in place without any necessity for change. While the spring in the preferred form is in a single piece, forming a multiplicity of waves or corrugations, it may, to meet certain conditions be separated into a plurality of separate independent springs of a similar form, the spring or springs being preferably secured to the gib so that they are inserted and removed with it, a further object of the invention being to provide a one piece spring gib which can have a spring pressure varied at points throughout its length to take care of tapered or unevenly machined parts.

A further object is to provide such a gib by means of which the adjusting pressure is applied at right angles to the gib by means of a spring or springs attached to the gib, which springs do not increase the dimensions or weight of the gib over what is necessary for a solid gib adjusted by means of set screws.

Still another object of the invention is to provide a spring gib of simple construction which can be cheaply produced in large quantities at small expense, the number of parts being greatly reduced as compared to the present practice.

In the accompanying drawings I have illustrated fragmentarily a bench grinding machine of the type most frequently used in grinding poppet valves for internal combustion engines, the said machine being equipped with a spring gib embodying the features of the invention in the preferred and certain alternative forms which are intended to illustrate the manner of constructing, applying and using the invention, and certain obvious variations of the same.

In the drawings:

Figure 9 is an end elevation of still another form of spring gib constructed in accordance with the invention.

Figure 1:
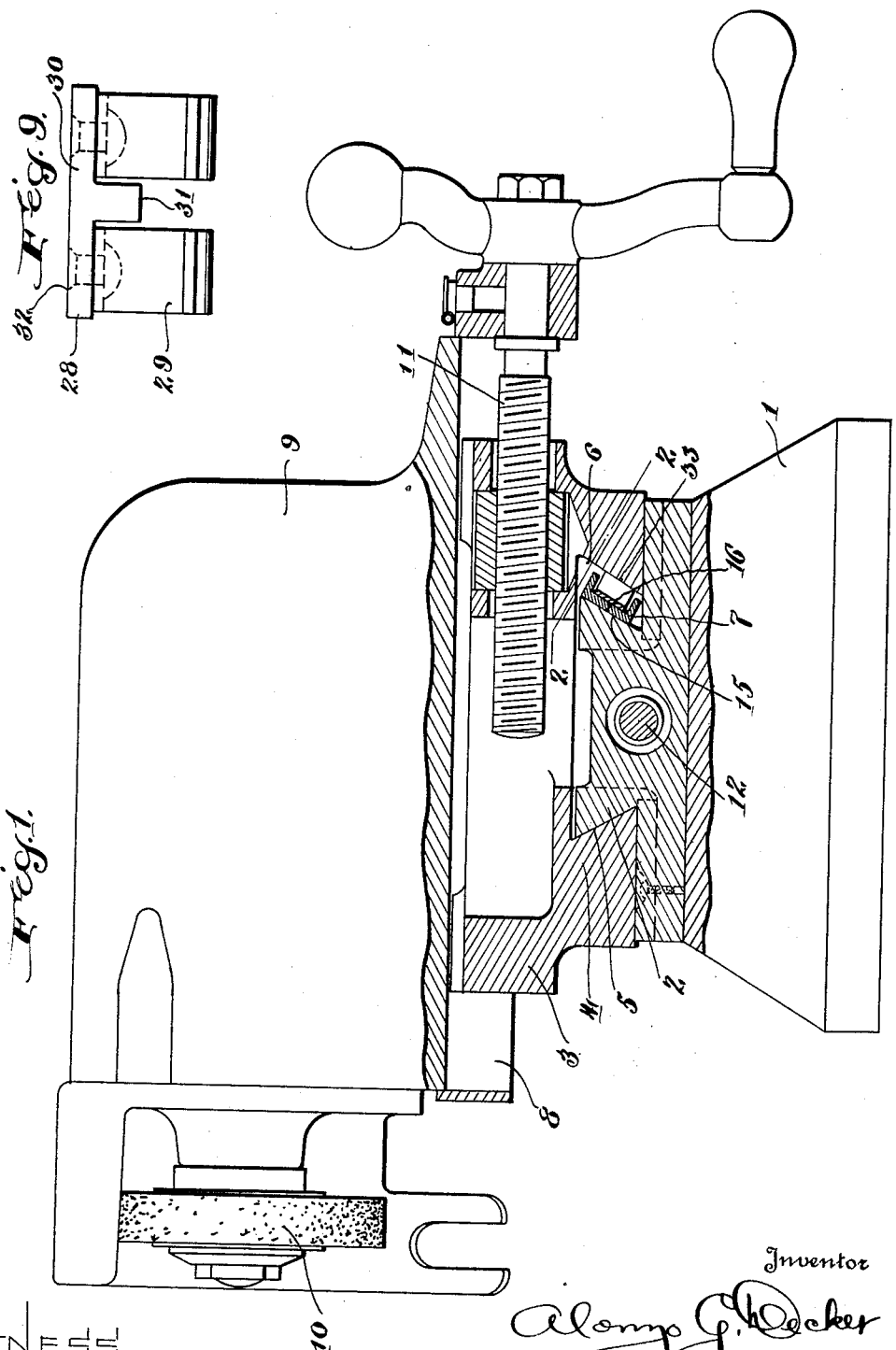
Figure 1 is an elevation of a grinder wheel carriage and bed, the figure being partly in vertical section taken transversely to one way, and on the axis of the other way, the grinding wheel being adjusted in two directions substantially at right angles to each other.
Figure 2:
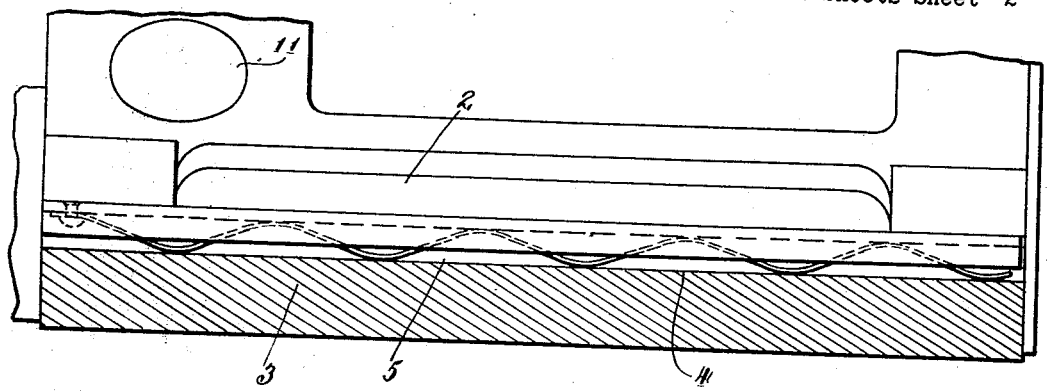
Figure 2 is a section on the line 2—2 of Figure 1.

Referring to the drawings by numerals, each of which is used to indicate the same or similar parts in the different figures, the structure as shown comprises a base 1, provided with a slideway or way 2, which is shown as of dovetailed cross section, and a carriage 3 having a slide 4, formed with a dovetailed groove 5 to receive and cooperate with the slideway 2, but of greater width, leaving a space 6 at one side in which is mounted the gib 7 which in the present instance is the spring gib of the invention.

The carriage 3 in the form of the invention shown is provided with a second way or slideway, which is engaged by a slide 8 on which is mounted the wheel carriage 9 carrying the wheel 10 and enclosing a suitable drive for the same not shown. The slide 8 is operated by the screw 11 and the slide 4 by the screw 12 shown in cross section only.

Figure 3:
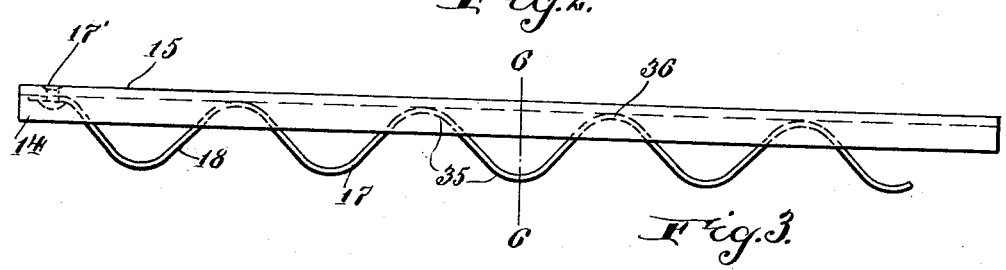
Figure 3 is a plan view of a spring gib and spring removed from the machine.
Figure 6:
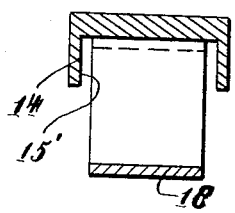
Figure 6 is a section on the line 6—6 of Figure 3.

The spring gib 7 in the preferred form illustrated in Figure 1, consists of a small channel iron 14, which is placed in the clearance space 6, with its bottom or rear surface 15, which is preferably finished; bearing against the side surface 16 of the slideway 2. This channel iron 14 contains in its channel space 15' a transversely corrugated plate or leaf spring 18, see Figures 3 and 6, as to which the corrugations 17 may be uniform or, if necessary, varied from the uniform, some being increased and others decreased to adapt the same to take up any corresponding irregularities in the machine. The corrugations form alternate oppositely disposed peaks 35 and 36, spaced in the direction of the length of the spring which extends along the gib for a distance corresponding to the length of the gib and in the preferred form approaching the length of the gib.

Figure 4:
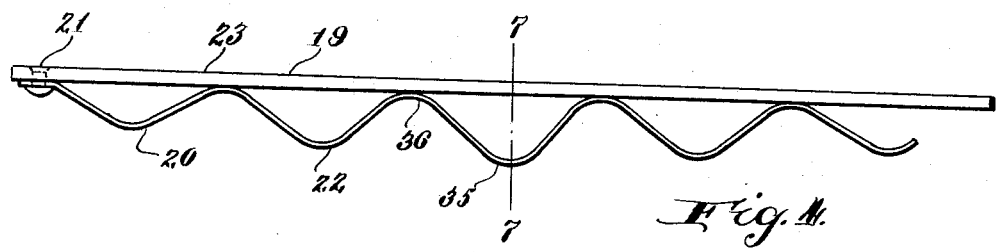
Figure 4 is a similar view showing a slightly different form of spring gib.
Figure 7:
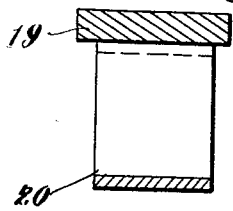
Figure 7 is a section on the line 7—7 of Figure 4.
Figure 8:
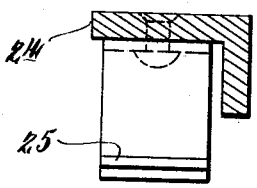
Figure 8 is a section on the line 8—8 of Figure 5.

Figures 4 and 7 show a spring gib in the form of a flat plate 19, to which is secured a corrugated strap leaf, or plate spring 20, the same being secured at one end by means of a rivet 21, as the previous spring is secured by a rivet 17' at one end, and in this instance the corrugations 22 are shown as of different sizes increasing from each end toward the center, the arrangement being dependent upon the form and fit of the parts, i. e., the slide and way.

Figure 5:
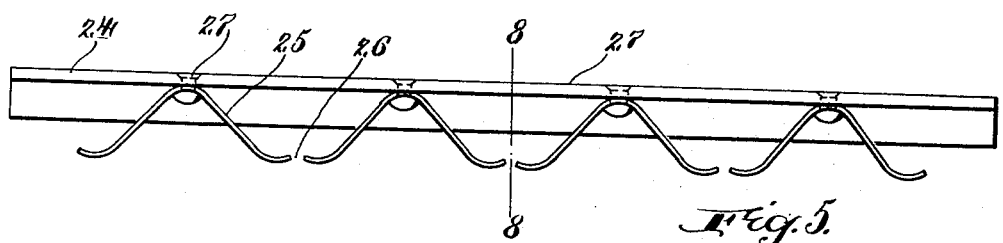
Figure 5 is a similar view showing still another form.

In Figure 5 I have illustrated still another form of spring gib shown as an angle iron 24, to one flange of which are secured by means of rivets 27 a plurality of bowed plate springs 25 arranged to take the form of a corrugated strip or plate spring like the spring 18, except that the peaks of the corrugation remote from the angle iron are severed at 26. These springs may be either uniform or adjusted out of the uniform to meet the requirements as above outlined. In use the surface 27' is preferably placed against the surface 16 of the way, the springs 25 bearing against the carriage at 33, but this arrangement, as in all other instances, may be varied.

Figure 9 shows a spring gib in the form of a T iron 28, a pair of corrugated plate springs 29 being secured to the T iron on the under side of the top cross bar 30 thereof on each side of the leg 31 of the T. This spring gib bears against the surface 16 of the slideway as to the top surface 32, Figure 9, the springs bearing against the opposite surface 33 of the groove 5.

It being understood that the slide and slideway are formed with a clearance as illustrated in Figure 1, the metal strip 14 or 19 or 24 is placed in the clearance space with its surface 15, 23, 27' remote from the springs and against the slideway surface 16. These gibs or strips 14, 19 and 24, are provided each with a corrugated leaf spring 18, 20, 25, extending in the direction of the length of the strip which is also the direction of the slide motion. These springs are secured to the respective strips on the side opposite to the surface 15, etc., which contacts with the surface 16 of the slideway; the peaks of the corrugations on one side rest against the strips 14, 19, etc., and on the other side they rest against the surface 33 of the carriage, i. e., the side wall of the groove opposite to the gib.

An important feature of the invention, aside from the simplicity and cheapness of the construction and the ease with which it may be installed, removed and replaced, resides in the facility with which it adjusts itself to any irregularities of machining or to variations in the width of the clearance groove resulting from any other source.

While the corrugations 22, Figure 4, may be of different heights as illustrated to correspond to said variations, it is also a fact that in use of the gib the corrugations tend to adjust themselves to the irregularities of the parts and for this purpose the springs 18 and 20, also 25, are preferably left free, at least on one end.

I have thus described specifically and in detail a preferred and several modified forms of spring gib embodying the features of the invention in order that the nature, manner of constructing, operating and using the same may be clearly understood. However, the specific terms herein are used descriptively rather than in a limiting sense, the scope of the invention being defined in the claims.

What I claim as new and desire to secure by Letters Patent is:

1. In a grinding or similar machine the combination of two members comprising a slideway and a slide of a spring gib between said members, said gib consisting of an elongated strip of metal bearing against one said member and a correspondingly elongated corrugated leaf spring secured to the strip, having a series of peaks and valleys spaced in the direction of its length, said strip bearing against one said member and the peaks of the leaf spring on one side of the spring resting on the other said member the peaks on the other side of the spring bearing on the strip, said peaks being distributed along the entire length of the strip which is supported solely by the spring which presses it against said member with a uniform tension throughout its length.

2. In a grinding or similar machine the combination of two members comprising a slide and a slideway having a gib space between said members and a spring gib in said space comprising a strip of metal bearing against one said member and a corrugated leaf spring having a series of alternate oppositely disposed peaks spaced in the direction of the length secured to said strip and bearing against the other said member on one side of the spring and against said stop on the other side of the spring, the peaks being distributed along the entire length of the strip.

3. In a grinding or similar machine the combination of two members comprising a slide and a slideway formed with a space between said members of a spring gib in said space, the same comprising a metal strip bearing against one said member, the strip extending in the direction of the sliding motion and a corrugated leaf spring also extending in the direction of the motion and secured to said strip, the leaf spring being formed in a series of oppositely disposed peaks, the spring bearing at the peaks of its corrugations against the strip and the other said member said peaks being distributed with substantial uniformity along the entire length of the strip, the spring serving as the sole support for said strip whereby it is pressed against said member.

4. In a machine of the type described the combination of a plurality of members comprising a slide and a slideway, said members being formed with a gib space and an automatic self adjusting spring gib in said space, and comprising a metal strip and resilient means secured to said strip and having a series of bearing points for engaging one of said members spaced along substantially the entire length of said strip the resilient means serving as the sole support for said strip applying substantially uniform tension thereto throughout its length.

5. In a grinding or similar machine the combination of two members comprising a slideway and a slide of a spring gib between said members, said gib consisting of an elongated strip of metal bearing against one said member and a correspondingly elongated corrugated leaf spring, having a series of peaks and valleys spaced in the direction of its length, said strip bearing against one said member and the peaks of the leaf spring on one side of the spring resting on the other said member the peaks on the other side of the spring bearing on the strip which is supported solely by said spring, the peaks being distributed along the entire length of said strip.

Signed by me at Towson, Maryland, this 19th day of July, 1929.

ALONZO G. DECKER.